US008478592B2

(12) United States Patent
Patel

(10) Patent No.: US 8,478,592 B2
(45) Date of Patent: Jul. 2, 2013

(54) ENHANCING MEDIA PLAYBACK WITH SPEECH RECOGNITION

(75) Inventor: Paritosh D. Patel, Parkland, FL (US)

(73) Assignee: Nuance Communications, Inc., Burlington, MA (US)

(*) Notice: Subject to any disclaimer, the term of this patent is extended or adjusted under 35 U.S.C. 154(b) by 902 days.

(21) Appl. No.: 12/180,583

(22) Filed: Jul. 28, 2008

(65) Prior Publication Data

US 2010/0010814 A1    Jan. 14, 2010

(51) Int. Cl.
| G10L 15/00 | (2006.01) |
| G10L 15/06 | (2006.01) |
| G10L 15/04 | (2006.01) |
| G10L 15/26 | (2006.01) |
| G10L 13/08 | (2006.01) |
| G06F 3/00 | (2006.01) |
| G06F 17/30 | (2006.01) |
| G06F 17/40 | (2006.01) |

(52) U.S. Cl.
USPC ........... 704/257; 704/260; 704/235; 704/253; 704/243; 715/716; 725/38; 707/802; 702/187

(58) Field of Classification Search
USPC ................................................. 704/260, 257
See application file for complete search history.

(56) References Cited

U.S. PATENT DOCUMENTS

| 6,374,226 | B1 * | 4/2002 | Hunt et al. ..................... 704/275 |
| 6,839,669 | B1 * | 1/2005 | Gould et al. ................... 704/246 |
| 6,912,498 | B2 * | 6/2005 | Stevens et al. ................ 704/235 |
| 7,058,889 | B2 * | 6/2006 | Trovato et al. ................ 715/716 |
| 7,149,693 | B2 * | 12/2006 | Laronne et al. ............... 704/270 |
| 7,707,227 | B2 * | 4/2010 | Shibata ......................... 707/802 |
| 7,805,304 | B2 * | 9/2010 | Washio ......................... 704/257 |
| 8,219,407 | B1 * | 7/2012 | Roy et al. ...................... 704/275 |
| 2003/0093790 | A1 * | 5/2003 | Logan et al. .................... 725/38 |
| 2007/0100634 | A1 * | 5/2007 | Cooper et al. ................. 704/275 |
| 2008/0270129 | A1 * | 10/2008 | Colibro et al. ................ 704/236 |
| 2008/0270138 | A1 * | 10/2008 | Knight et al. ................. 704/260 |
| 2009/0006091 | A1 * | 1/2009 | Lindroos et al. .............. 704/243 |
| 2009/0037176 | A1 * | 2/2009 | Arrowood ..................... 704/253 |
| 2009/0259473 | A1 * | 10/2009 | Chang et al. .................. 704/260 |

* cited by examiner

*Primary Examiner* — Pierre-Louis Desir
*Assistant Examiner* — Neeraj Sharma
(74) *Attorney, Agent, or Firm* — Wolf, Greenfield & Sacks, P.C.

(57) ABSTRACT

A method for enhancing a media file to enable speech-recognition of spoken navigation commands can be provided. The method can include receiving a plurality of textual items based on subject matter of the media file and generating a grammar for each textual item, thereby generating a plurality of grammars for use by a speech recognition engine. The method can further include associating a time stamp with each grammar, wherein a time stamp indicates a location in the media file of a textual item corresponding with a grammar. The method can further include associating the plurality of grammars with the media file, such that speech recognized by the speech recognition engine is associated with a corresponding location in the media file.

18 Claims, 1 Drawing Sheet

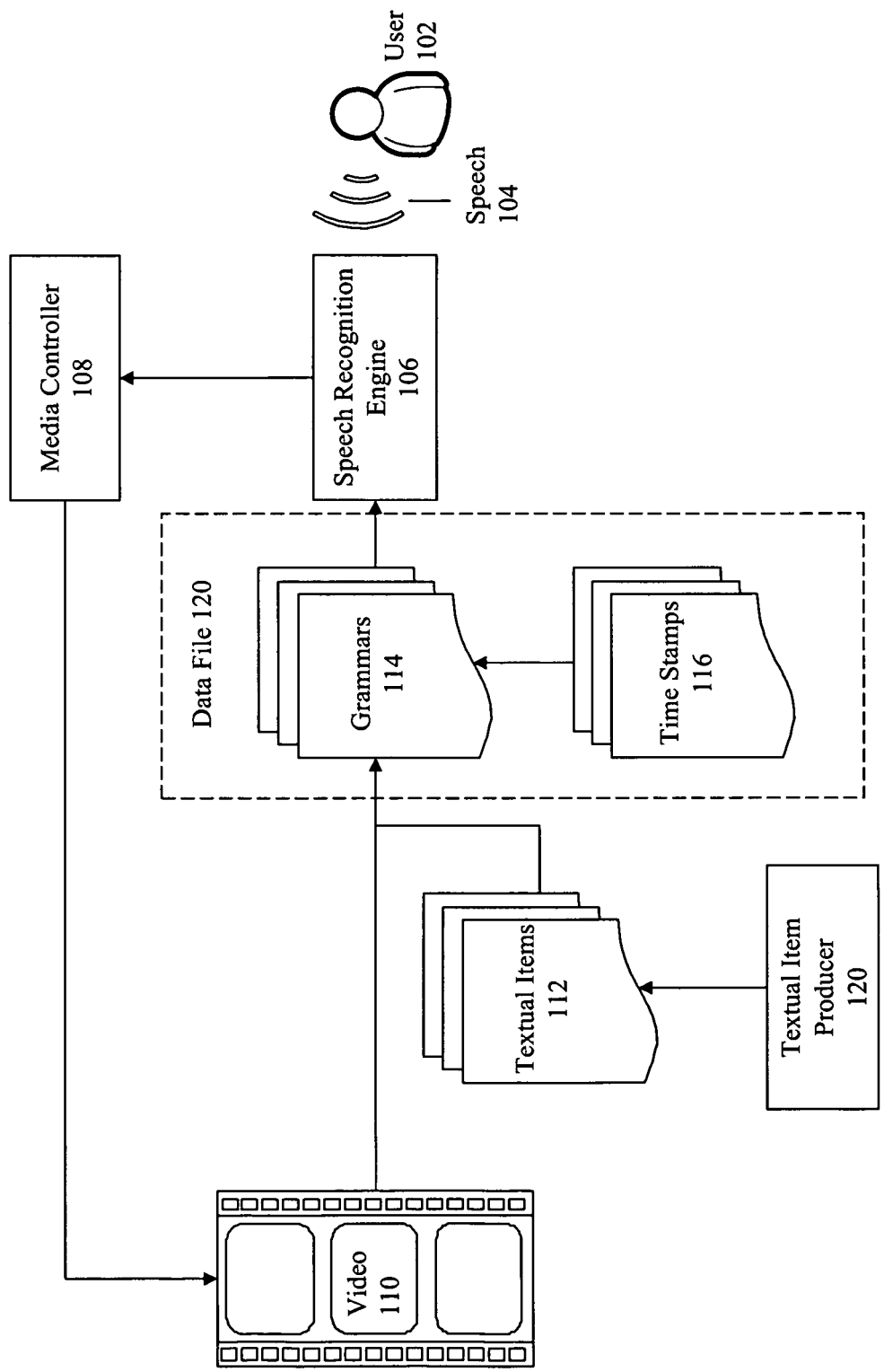

ENHANCING MEDIA PLAYBACK WITH SPEECH RECOGNITION

BACKGROUND OF THE INVENTION

1. Field of the Invention

The present invention relates to media playback, and more particularly relates to the enhancement of media playback via speech recognition.

2. Description of the Related Art

Playback of media files, such as video or audio files, has not changed in many years. Playback of these media files typically consists of a user interacting with a remote control, a keyboard or another user input device, wherein the user may choose from a set of buttons representing navigation commands. There are normally a limited number of navigation commands available such as play, reverse, fast forward, skip to the next chapter and stop.

Conceptually, there are a myriad of natural language navigation commands that better represent the navigation desired by a user. Taking a recorded football game for example, a user may desire to start watching from the second quarter of the football game, see the first score of the football game, or see the first turnover of the football game. These types of navigation commands, however, are not available by current media playback systems. As a result, a user must use the reverse and fast forward commands to advance the video to the desired point, which may comprise trial and error in finding the desired location. This can be time consuming and annoying for users of the media playback system.

Therefore, a need arises for a more efficient method for navigating media files using natural language navigation commands.

BRIEF SUMMARY OF THE INVENTION

Embodiments of the present invention address deficiencies of the art in respect to media playback and provide a novel and non-obvious method, computer system and computer program product for enhancing a media file to enable speech recognition of navigation commands. In one embodiment of the invention, a method for enhancing a media file to enable speech-recognition of spoken navigation commands can be provided. The method can include receiving a plurality of textual items based on subject matter of the media file and generating a grammar for each textual item, thereby generating a plurality of grammars for use by a speech recognition engine. The method can further include associating a time stamp with each grammar, wherein a time stamp indicates a location in the media file of a textual item corresponding with a grammar. The method can further include associating the plurality of grammars with the media file, such that speech recognized by the speech recognition engine is associated with a corresponding location in the media file.

In another embodiment of the invention, a computer program product comprising a computer usable medium embodying computer usable program code for enhancing a media file to enable speech-recognition of spoken navigation commands is provided. The computer program product includes computer usable program code for receiving a plurality of textual items based on subject matter of the media file and computer usable program code for generating a grammar for each textual item, thereby generating a plurality of grammars for use by a speech recognition engine. The computer program product further includes computer usable program code for associating a time stamp with each grammar, wherein a time stamp indicates a location in the media file of a textual item corresponding with a grammar. The computer program product further includes computer usable program code for associating the plurality of grammars with the media file, such that speech recognized by the speech recognition engine is associated with a corresponding location in the media file.

In yet another embodiment of the invention, a computer system for enhancing a media file to enable speech-recognition of spoken navigation commands is provided. The computer system includes a processor configured for receiving a plurality of textual items based on subject matter of the media file and generating a grammar for each textual item, thereby generating a plurality of grammars for use by a speech recognition engine. The computer system further includes a repository for storing a grammar file including the plurality of grammars, wherein a time stamp is associated with each grammar, and wherein a time stamp indicates a location in the media file of a textual item corresponding with a grammar. The repository further stores a link for associating the grammar file with the media file, such that speech recognized by the speech recognition engine is associated with a corresponding location in the media file.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a block diagram illustrating a general process for enhancing a media file to enable speech recognition of navigation commands, according to one embodiment of the present invention.

DETAILED DESCRIPTION OF THE INVENTION

Embodiments of the present invention address deficiencies of the art in respect to media playback and provide a novel and non-obvious method, computer system and computer program product for enhancing a media file, such as a video or audio file, to enable speech recognition of spoken navigation commands. The method can include receiving text for the media file, such as text corresponding to events experienced in the media file during playback. Subsequently, a grammar is generated for pertinent text, thereby generating a plurality of grammars for use by a speech recognition engine. Then, a time stamp is placed on each grammar, wherein a time stamp indicates a location in the media file of text corresponding with a grammar. Finally, the plurality of grammars is associated with the media file, such that speech recognized by the speech recognition engine is associated with a corresponding location in the media file.

FIG. 1 is a block diagram illustrating a general process for enhancing a media file to enable speech recognition of navigation commands, according to one embodiment of the present invention.

FIG. 1 shows a media file 110. Although the media file 110 is represented as a video file 110, the media file 110 may be any kind of media file, such as an audio file or a Flash file. Media file 110 may also represent a collection of media files such as a collection of photographs or a collection of song files. In a first step, text is received for the video file 110 from a textual item producer 120. The textual data received can be any textual data pertaining to the subject matter of the video file 110, such as any words spoken in the media file during playback or words describing events that occur or are experienced during playback. In a sports event example, the textual data received can be the game time, the score of the game at any point, the occurrence of a scoring event, the location of the event, the names of the teams and the names of the players.

The reception of textual data from the video file 110 may be accomplished in variety of ways. In one embodiment, the text for video file 110 is gathered from a computer or other computer equipment (120) that contains textual data pertaining to the subject matter of the video file 110. For example, an electronic scoreboard for a football game that is recorded by video file 110 contains a variety of textual data pertaining to the subject matter of the video file 110, such as current game time, current score, timeouts left, the names of the teams and the number of fouls for each team. In this example, the electronic scoreboard produces the textual data above based on the data it collects during the game. In yet another embodiment, the text for video file 110 is received from a user 120 that enters the textual data into a computer, such as through typing into a computer or speaking into a speech-recognition-enabled computer. In yet another embodiment, text for the video file 110 is received from a third party 120 that has generated the textual data using any one or more of the methods above.

The result of the first step above is a set of textual items 112. In one embodiment of the present invention, the textual items 112 are limited to a set of predefined textual data from the video file 110 that represent pertinent textual data. Examples of pertinent textual data for a football game recorded by video file 110 include the game time at various points, the score at various points, timeouts left at various points, names of the teams, number of fouls for each team at various points, the occurrence of all scoring events, the location of the event and the names of the players.

In one embodiment of the present invention, the reception step above involves the use of predefined templates that identify values that must be defined for particular types of media files 110. Predefined templates provide a list of pertinent textual items that must be defined. For example, in the case of a football game that is recorded by the video file 110, the predefined template would identify a set of textual items that represent the pertinent data regarding the subject matter of the football game, such as the game time at various points, the score at various points, timeouts left at various points, names of the teams, number of fouls for each team at various points, the occurrence of all scoring events, the location of the event and the names of the players. The use of such a template reduces the complexity of the textual reception step and reduces the amount of time and resources necessary to perform the step as it focuses the textual reception on a limited number of pertinent items, thereby eliminating the reception of extraneous or unimportant textual data.

In another embodiment of the present invention, a categorization step is executed before or after the textual reception step described above. In this embodiment, the textual items 112 are arranged according to a predefined set of categories. Using a recorded football as an example, the textual items 112 can be categorized according to the following categories for textual data: data related to scores, data related to a scoring event, data related to a foul, data related to a timeout, data related to a player name, data related to game time and data related to a turnover. Using this categorization scheme, access times related to searching for and finding desired textual data are reduced.

In a next step, a set of grammars 114 are generated for the textual items 112. For each textual item 112, a corresponding grammar is generated. A speech recognition grammar is a set of word patterns, and tells a speech recognition system what to expect a human to say. For instance, a voice directory application will prompt a user for the name of the person the user is seeking. The voice directory application will then start up a speech recognizer, giving it a speech recognition grammar. This grammar contains the names of the people in the directory, and the various sentence patterns with which users typically respond. When speech is recognized as one of the names in a grammar, the speech recognition system returns the natural language interpretation of the speech, i.e., the directory name.

In one embodiment of the present invention, the grammars 114 adhere to one of the following open standard textual grammar formats: Backus-Naur Form (BNF), Augmented Backus-Naur Form (ABNF) or Speech Recognition Grammar Specification (SRGS). Below is an example of a grammar in textual format, representing a common navigation command such as "Go to the first quarter."

```
<root> = <goto_pos> | <score_pos> | <foul_pos> .
<goto_pos> = go to <quarter>
<quarters> = first quarter | second quarter | third quarter | fourth quarter.
<score_pos> = [Miami] Dolphins first score | New Englands first score |
game winning scrore .
<foul_pos> = first [Miami] Dolphins foul.
```

Subsequently, time stamps are associated with each grammar. A time stamp provides a location of a textual item in the video file 110, wherein the textual item corresponds to the grammar. A time stamp typically comprises an hour, minute, second indicator that describes the location of an event in the video file 110 from the start of the video. The location (indicated in hours, minutes, second, for example) of each textual item 112 in the video file 110 may be logged when the textual items 110 are generated in the step above. Consequently, the time stamp for each textual item is associated with the grammar corresponding to the textual item. As a result of this step, the grammars 114 are associated with time stamps 116.

In one embodiment of the present invention, grammars 114 can be sensitive to the time at which a grammar is recognized. For example, a grammar that is recognized at one point in time may provide a different result from a grammar that is recognized at another point in time. Using a recorded football game as an example, a grammar that represents the question command "show me the last touchdown?" would produce a different result during the first quarter of the game than during the last quarter of the game. This embodiment can be implemented using an algorithm that considers the current time when the question command is recognized. Current time is defined as the current time since the beginning of the video. The algorithm would then search for the grammars pertaining to touchdowns and find the grammar with a time stamp closest to the current time but less than the current time. In another example, a grammar that represents the question command "show me the last quarter?" can be implemented using an algorithm that considers the current time when the question command is recognized. The algorithm would then search for the grammars pertaining to the beginning of each quarter and find the grammar with a time stamp closest to the current time but less than the current time.

In an embodiment of the present invention, the data file 120 (comprising the grammars 114 and time stamps 116) and the corresponding video file 110 are stored together (in the same directory and/or linked) on removable media, such as a CD, a DVD, a Blue Ray Disc, a flash memory module on a portable media player or a smart phone. In another embodiment of the present invention, video file 110 is stored on removable media and the corresponding data file 120 is stored in a remote location, such as on a web server accessible through the internet In this embodiment, a link is embedded in the video file 110, wherein the link references the remote location of the data file 120. This concludes the preparation phase of the present invention.

The next phase of the present invention involves speech recognition of spoken navigation commands during playback of the video file 110. In this phase, a user 102 is playing back the video file 110. In order to enable speech recognition of spoken navigation commands, the speech recognition engine 106 references the data file 120. Then, the speech recognition engine 106 utilizes the grammars 114 of data file 120 to recognize speech 104 spoken by a user 102 of a media player. The speech recognition engine 106 may also utilize additional speech recognition parameters such as weights, accuracy settings, threshold values and sensitivity values. The user 102 may be speaking into a microphone, a remote control, a mobile telephone, or the like.

When the speech recognition engine 106 recognizes a spoken word or phrase corresponding to a grammar, the time stamp associated with the grammar is referenced. Recall that the grammars 114 are associated with time stamps 116. The speech recognition engine 106 sends to the media controller 108 the time stamp corresponding to the recognized grammar. The media controller 108 controls the playback of the video 110 and may comprise a media playback mechanism such as a DVD player. Subsequently, the media controller 108 navigates to the time stamp it received from the speech recognition engine 106. Thus, the user 102 views the video 110 at the time stamp associated with the recognized grammar, which corresponds to textual data that was received for the video file 110.

In one embodiment of the present invention, venue data pertaining to the video file 110 is available to the user 102 during playback of the video file 110. In this embodiment, the textual items relating to venue data are received within textual items 112. Using the recorded football game as an example, venue data would comprise a variety of information about the game, such as the location of the game, the data of the game, the teams playing and the playoff round being played, if any. The textual items related to venue data may be received in a predefined template format, as discussed in greater detail above.

Further in this embodiment, when the grammars 114 are generated based on the venue data, the venue data grammars would represent question commands from the user 102 wherein the user 102 requests to see all or a portion of the venue data. The venue data grammars represent certain common expressions regarding venue data such as "who is playing?" "When was this game played?" or "where was this game played?" The venue data grammars are subsequently associated with a text string corresponding to the answer to the question command represented by the grammar. For example, the venue data grammar for the question command "who is playing?" is associated with the text string "Dolphins and Jets." In this embodiment, time stamps are not associated with grammars based on venue data.

When the speech recognition engine 106 recognizes a spoken word or phrase corresponding to a venue data grammar, the text string associated with the grammar is referenced. The speech recognition engine 106 sends to the media controller 108 the text string corresponding to the recognized grammar. Subsequently, the media controller 108 displays the text string it received from the speech recognition engine 106. Thus, the user 102 views or spoken using text to speech (TTS) the answer to the question posed by the user 102.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A method for enhancing a media file to enable speech-recognition of spoken navigation commands, comprising:
   receiving a plurality of textual items relating to the subject matter of the media file;
   generating at least one grammar comprising one or more grammar entries, wherein the one or more grammar entries comprise grammar entries that are generated for at least some of the plurality of the textual items, and comprise a word or word sequence recognizable by a speech recognition engine;

for each of the grammar entries corresponding to content in the media file, determining one or more time stamps for the grammar entry, each time stamp indicating a location in the media file of content corresponding to the grammar entry; and via a computer processor, locating content in the media file during playback of the media file by (a) receiving speech input from a user, (b) recognizing the speech input using the speech recognition engine and the at least one grammar to produce a speech recognition result corresponding at least in part to a recognized grammar entry of the at least one grammar, and (c) identifying one or more locations in the media file by identifying the one or more time stamps determined for the recognized grammar entry and the current time position of the media file at playback when the user input is received, wherein upon identifying the location in the media file a media controller navigates to the time stamp identified and presents the media file to the user at the identified timestamp location.

2. The method of claim 1, wherein the step of receiving a plurality of textual items further comprises:
receiving textual data provided by a computer via a data connection and generating a plurality of textual items based on the textual data.

3. The method of claim 1, wherein the step of receiving a plurality of textual items further comprises:
receiving textual data provided by a user via a user input device and generating a plurality of textual items based on the textual data.

4. The method of claim 3, wherein the step of receiving a plurality of textual items further comprises:
receiving textual data that has been organized into categories based on content of the textual items.

5. The method of claim 1, further comprising:
storing the at least one grammar and the media file on removable media.

6. The method of claim 1, further comprising:
storing the at least one grammar in a remote location on a network;
embedding a link in a media file to the remote location of the at least one grammar; and
storing the media file on removable media.

7. A non-transitory computer-readable storage medium storing computer usable program code for enhancing a media file to enable speech-recognition of spoken navigation commands, comprising:
computer usable program code for receiving a plurality of textual items relating to the subject matter of the media file;
computer usable program code for generating at least one grammar one or more grammar entries, wherein the one or more grammar entries comprise grammar entries that are generated for at least some of the plurality of the textual items and comprise a word or word sequence recognizable by a speech recognition engine;
computer usable program code for, for each of the grammar entries corresponding to content in the media file, determining one or more time stamps for the grammar entry, each time stamp indicating a location in the media file of content corresponding to the grammar entry; and
computer usable program code for locating content in the media file during playback of the media file by (a) receiving speech input from a user, (b) recognizing the speech input using the speech recognition engine and the at least one grammar to produce a speech recognition result corresponding at least in part to a recognized grammar entry of the at least one grammar, and (c) identifying one or more locations in the media file by identifying the one or more time stamps determined for the recognized grammar entry and the current time position of the media file at playback when the user input is received, wherein upon identifying the location in the media file a media controller navigates to the time stamp identified and presents the media file to the user at the identified timestamp location.

8. The non-transitory computer-readable storage medium of claim 7, wherein the computer usable program code for receiving a plurality of textual items further comprises:
computer usable program code for receiving textual data provided by a computer via a data connection and generating a plurality of textual items based on the textual data.

9. The non-transitory computer-readable storage medium of claim 7, wherein the computer usable program code for receiving a plurality of textual items further comprises:
computer usable program code for receiving textual data provided by a user via a user input device and generating a plurality of textual items based on the textual data.

10. The non-transitory computer-readable storage medium of claim 9, wherein the computer usable program code for receiving a plurality of textual items further comprises:
computer usable program code for receiving textual data that has been organized into categories based on content of the textual items.

11. The non-transitory computer-readable storage medium of claim 7, further comprising:
computer usable program code for storing the at least one grammar and the media file on removable media.

12. The non-transitory computer-readable storage medium of claim 7, further comprising:
computer usable program code for storing the at least one grammar in a remote location on a network;
computer usable program code for embedding a link in a media file to the remote location of the at least one grammar; and
computer usable program code for storing the media file on removable media.

13. A computer system for enhancing a media file to enable speech-recognition of spoken navigation commands, comprising:
a processor configured for:
receiving a plurality of textual items relating to the subject matter of the media file;
generating at least one grammar comprising one or more grammar entries, wherein the one or more grammar entries comprise grammar entries that are generated for at least some of the plurality of the textual items and comprise word or word sequence recognizable by a speech recognition engine;
receiving speech input from a user; and
recognizing the speech input using the speech recognition engine and the at least one grammar to produce a speech recognition result corresponding at least in part to a recognized grammar entry of the at least one grammar; and
a repository for storing:
a grammar file including the at least one grammar, wherein one or more time stamps are determined for each of the grammar entries that correspond to content in the media file, and wherein each time stamp indicates a location in the media file of content corresponding to the grammar entry; and a link for locating content in the media file during playback of the media file by identifying one or more locations in the media file by identifying the one or more time stamps determined for the selected recognized grammar entry and the current time position of the media file at playback when the user input is received, wherein upon identifying the location in the media file a media controller navigates to the time stamp identified and presents the media file to the user at the identified timestamp location.

14. The computer system of claim 13, wherein each textual item comprises text describing events of the media file.

15. The computer system of claim 14, wherein the media file comprises a video file.

16. The computer system of claim 15, wherein a time stamp includes an hour, minute and second indicator.

17. The computer system of claim 13, further comprising removable media for storing the grammar file and the media file.

18. The computer system of claim 13, further comprising removable media for storing the media file including a link to a remote location of the grammar file.

* * * * *